US006529898B1

(12) United States Patent
Fortner et al.

(10) Patent No.: US 6,529,898 B1
(45) Date of Patent: Mar. 4, 2003

(54) METHOD AND SYSTEM FOR ELECTRONICALLY RETRIEVING DOOR HARDWARE DATA

(76) Inventors: Matthew Shawn Fortner, 10155 FM 1565, Terrell, TX (US) 75160; Byron Williams, 1901 NW. 17th, Oklahoma City, OK (US) 73106; Dewayne Irwin, 3806 Knights Bridge Dr., Rowlett, TX (US) 75088

( * ) Notice: Subject to any disclaimer, the term of this patent is extended or adjusted under 35 U.S.C. 154(b) by 0 days.

(21) Appl. No.: 09/358,882

(22) Filed: Jul. 22, 1999

(51) Int. Cl.[7] .............................................. G06F 17/30
(52) U.S. Cl. ..................... 707/3; 707/10; 707/103 R; 707/104.1
(58) Field of Search ............................. 707/3, 4, 5, 10, 707/103 R, 104.1, 102; 345/968, 6

(56) References Cited

U.S. PATENT DOCUMENTS

| | | | | | |
|---|---|---|---|---|---|
| 4,821,211 A | * | 4/1989 | Torres | .......................... | 345/581 |
| 4,879,648 A | * | 11/1989 | Cochran et al. | ............. | 707/507 |
| 4,959,686 A | * | 9/1990 | Spallone et al. | ............... | 705/26 |
| 5,187,797 A | * | 2/1993 | Nielsen et al. | ............... | 345/708 |
| 5,206,949 A | * | 4/1993 | Cochran et al. | ................ | 707/4 |
| 5,241,671 A | * | 8/1993 | Reed et al. | ...................... | 707/3 |
| 5,319,542 A | * | 6/1994 | King et al. | .................... | 705/27 |
| 5,426,594 A | * | 6/1995 | Wright et al. | ................ | 709/206 |
| 5,544,352 A | * | 8/1996 | Egger | ............................ | 707/5 |
| 5,781,773 A | * | 7/1998 | Vanderpool et al. | ......... | 707/100 |
| 5,813,014 A | * | 9/1998 | Gustman | ..................... | 707/103 |
| 5,826,263 A | * | 10/1998 | Nakabayashi et al. | ......... | 707/7 |
| 5,832,494 A | * | 11/1998 | Egger et al. | ................. | 707/102 |
| 5,905,988 A | * | 5/1999 | Schwartz et al. | ............ | 707/104 |
| 5,983,219 A | * | 11/1999 | Danish et al. | .................. | 707/3 |
| 5,999,940 A | * | 12/1999 | Ranger | ........................ | 707/103 |
| 6,049,806 A | * | 4/2000 | Crecine | ...................... | 707/200 |
| 6,169,992 B1 | * | 1/2001 | Beall et al. | ............. | 707/103 R |
| 6,199,060 B1 | * | 3/2001 | Gustman | ........................ | 707/3 |
| 6,233,571 B1 | * | 5/2001 | Egger et al. | ................... | 707/2 |

* cited by examiner

Primary Examiner—Shahid Al Alam
(74) Attorney, Agent, or Firm—Godwin Gruber P.C.; Arthur I. Navarro (57) ABSTRACT

A method and system for electronically retrieving door hardware items from a database operably coupled to a search mechanism within a data-processing system. The search mechanism can be operated to retrieve specified door hardware items from the database based on a set of user entered search criteria. Thereafter, more specific data can be electronically retrieved from the database via the search mechanism, in response to further user input. The door hardware items are then displayed in a graphical user interface, in response to retrieval of specified door hardware items from the database. Object fields are also displayed in the graphical user interface, such that each object field is associated with a particular subset of the database. The user is then graphically prompted to select a particular subset of the database by selecting a particular object field, thereby narrowing the scope of the database search with increasing granularity.

31 Claims, 9 Drawing Sheets

| NAME | TYPE | DESCRIPTION |
|---|---|---|
| Name | character pointer | Holds the name of the field |
| Index | integer | the order of the field in the c-tree table |
| CurrentFilter | void pointer | the value of the current filter for the field |
| Type | enumerated | a defined list of possible data types |
| FileNo | unsigned int | reference to a c-Tree file |

| NAME | RETURNS | DESCRIPTION |
|---|---|---|
| getAsString | character pointer | returns the value as a char pointer |
| getAsInteger | integer pointer | returns the value as an integer pointer |
| getAsFloat | double pointer | returns the value as a double pointer |
| getAsDate | date pointer | returns the value as a date pointer |
| getAsTime | time pointer | returns the value as a time pointer |
| NAME | PARAMETER | DESCRIPTION |
| putValue | character pointer | Inserts a value into dsField. The value will be taken |
| (overload) | integer | from the parameter, and translated, if necessary |
| (overload) | integer pointer | |
| (overload) | double | |
| (overload) | double pointer | |
| (overload) | date | |
| (overload) | date pointer | |
| (overload) | time | |
| (overload) | time pointer | |
| setSize | integer | indicate the size in bytes of the field |
| getSize | void | returns integer of size |

| SET 1 | SET 2 | SET 3 | INTERSECTION |
|---|---|---|---|
| 1 | | 1 | |
| 2 | 2 | 2 | 2 |
| | 3 | | |
| 4 | 4 | 4 | 4 |
| 5 | 5 | | |
| 6 | | | |

| NAME | PARAMETER | DESCRIPTION |
|---|---|---|
| Add | sdField pointer | adds a sdField to the list |
| Add | char pointer | adds a sdField with the parameter as name |
| Add | integer | adds a sdField with the parameter as index |
| Del | integer | removes the sdField[int] from the list |
| isField | int | returns 1 if sdField[int] is in list |
| isField | char* | returns 1 if sdField with name of char* in list |
| setName | integer, char* | sets sdField[integer] name to parameter |
| setType | integer, enum | sets sdField[int] type to enum of parameter |
| setSize | int, int | sets sdField[int] size to size of parameter |
| getField | int | returns sdField pointer to sdField[int] |
| getValueAsString | int | returns the value of sdField[int] as a char* |
| getValueAs Int | int | returns the value of sdField[int] as an integer |
| getValueAsFloat | int | returns the value of sdField[int] as a float |
| getValueAsDate | int | returns the value of sdField[int] as a date* |
| getValueAsTime | int | Returns the value of sdField[int] as a time* |
| setValue | int, char* | sets the value of sdField[int] from the char* |
| setValue | int, int | sets the value of sdField[int] from the int |
| setValue | int, float | sets the value of sdField[int] from the float |
| setValue | int, date | sets the value of sdField[int] from the date |
| setValue | int, time | sets the value of sdField[int] from the time |
| setFilter | int, char* | sets the filter of sdField[int] from the char* |

| PROPERTY | TYPE | DESCRIPTION |
|---|---|---|
| Table | char* | Name of the c-Tree table (not really functional) |
| FileNo | int | The c-Tree file number used internally to access ISAM functionality |
| METHOD | PARAMETERS | DESCRIPTION |
| FirstRec | void | fills the sdFieldList fields with data from a c-Tree file |
| NextRec | void | fills the sdFieldList fields with data from the next record |
| LastRec | void | fills the sdFieldList fields with data from the last record |
| ClearFilters | void | clears all filter values in each sdField object |
| SubSet | void | finds the subset of all sdField object sets |
| getFieldByName | char* | returns the value of the sdField with the parameter name |
| getFieldByNo | int | returns the value of the sdField with the parameter number |

METHOD AND SYSTEM FOR ELECTRONICALLY RETRIEVING DOOR HARDWARE DATA

TECHNICAL FIELD OF THE INVENTION

The present invention is related to methods and systems for electronically retrieving specified items from a database. In particular, the present invention relates to techniques for searching and retrieving door hardware data maintained in a database. More particularly, the present invention relates to techniques for permitting users to graphically display retrieved door hardware data.

BACKGROUND AND DESCRIPTION OF THE RELATED ART

Locksmiths have traditionally relied upon printed materials in the form of catalogs to search and retrieve information about specific door hardware items, such as locks, strike plates and hinges. While reliance upon printed materials is useful in some instances, the locksmith usually finds it difficult to peruse hundreds of pages of intricately labeled cataloged items to find the desired door hardware component in as brief a time span as possible. In short, printed catalogs containing door hardware items, such as locks, doorknobs, and so forth, are inefficient, time consuming, and expensive to use in an age when customers require and are willing to pay for instantaneously obtained door hardware information, including graphical designs, and individual component and manufacturer information.

A problem faced by locksmiths and those involved in the door hardware industry is the sheer number of door hardware catalogs available. The catalogs differ in size and format. A unified system of searching cataloged door hardware information is simply not available. Thus, any attempts at cross-referencing door hardware assembly items, sub-assembly items, and individual components is a task dependent upon the skill of a locksmith or other door hardware industry employee in utilizing a complex and cumbersome system of printed indexes and catalogs.

These individuals are also faced with the costs associated with printing media from the printed catalogs themselves. Because each catalog differs according to manufacturer specification, the field of choices available to a locksmith or door hardware designer is limited. The ability to mix and match items from different manufacturers in order to provide unified door hardware items for a customer usage is presently limited.

Based on the foregoing, it can be appreciated that a need exists for a standard method and system for unifying and presenting manufacturer door hardware items. Such a method and system, if implemented, would be of great benefit to locksmiths and others working in the door hardware industry. Such a method and system would limit errors in door hardware component orders by permitting a locksmith or user to identify a component part by manufacturer, assembly, or sub-assembly data.

It is envisioned that such a method and system, if implemented via a graphical user interface (GUI), well known in the data-processing arts, would permit fast and efficient cross-referencing of sub-assembly, assembly, product number and other door hardware components regardless of manufacturer origin. The method and system described and presented herein rises to these challenges by solving the aforementioned problems faced by locksmiths and others employed in the door hardware industry.

SUMMARY OF THE INVENTION

It is therefore one object of the present invention to provide an improved database retrieval method and system for electronically retrieving specified items from a database.

It is another object of the present invention to provide a method and system for searching and retrieving door hardware data maintained in a database of door hardware items.

It is still another object of the present invention to provide a method and system that permits users to graphically display retrieved door hardware data.

The above and other objects are achieved as is now described. A method and system for electronically retrieving door hardware items from a database operably coupled to a search mechanism within a data-processing system is disclosed. The search mechanism is initially configured to retrieve specified door hardware items from the database based on a set of user entered search criteria. Thereafter, specified door hardware items can be electronically retrieved from the database via the search mechanism, in response to user input. The door hardware items are then displayed in a graphical user interface, in response to retrieval of specified door hardware items from the database. Object fields are also displayed in the graphical user interface, such that each object field is associated with a particular subset of the database. The user is then graphically prompted to select a particular subset of the database by selecting a particular object field, thereby narrowing the scope of the database search with increasing granularity.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

FIG. 7 illustrates a diagram listing properties associated with the second of three primary programming objects utilized in accordance with a preferred embodiment of the present invention;

FIG. 8 depicts a diagram listing methods and properties associated with the third of three primary programming objects utilized in accordance with a preferred embodiment of the present invention;

DETAILED DESCRIPTION OF PREFERRED EMBODIMENT

Figure 1:
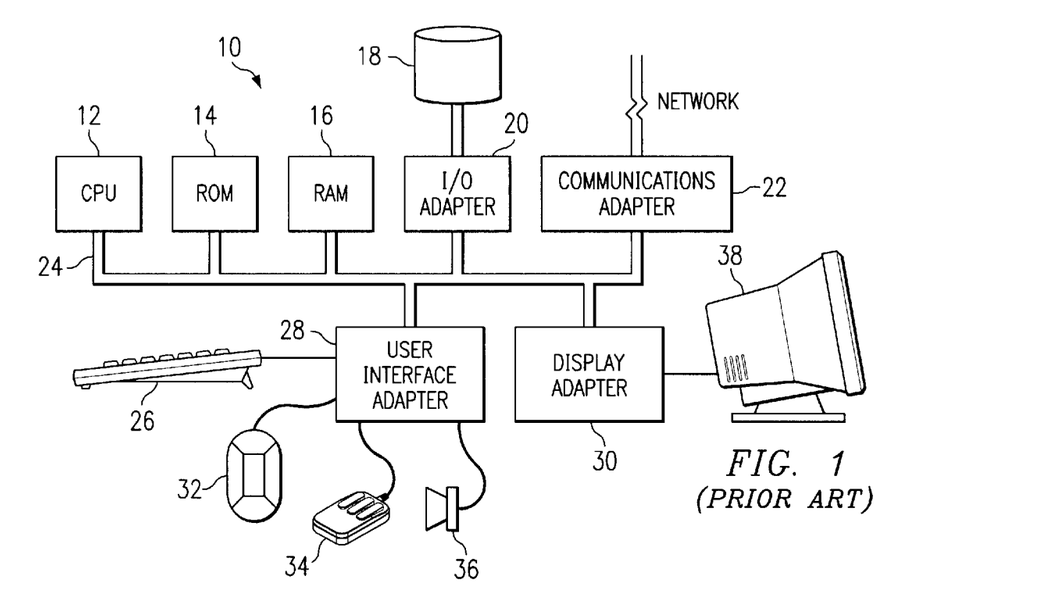
FIG. 1 illustrates a data-processing system in which a preferred embodiment of the present invention can be implemented.

With reference now to the figures and in particular with reference to FIG. 1, therein is illustrated a data-processing system 10 in which a preferred embodiment of the present invention may be implemented. Data-processing system 10 includes a CPU (Central Processing Unit) 12, such as a conventional microprocessor, and a number of other units interconnected via system bus 24. Data-processing system 10 includes read only memory ("ROM") 14, random access memory ("RAM") 16, display adapter 30 for connecting system bus 24 to display device 38, and I/O (Input/Output) adapter 20 for connecting peripheral devices (e.g., disk and tape drives 18) to system bus 24.

Data-processing system 10 further includes user interface adapter 28 for connecting keyboard 26, mouse 34, speaker 36, microphone 32, and other user interface devices to system bus 24. Communications adapter 22 connects data-processing system 10 to a data-processing network. A database containing hardware tool data may be stored electronically at a memory location within data-processing system 10, in accordance with the method and system described herein.

Data-processing system 10 also includes a graphical user interface (GUI) that resides within a machine-readable media to direct the operation of data-processing system 10. A graphical user interface, well-known in the data-processing arts, is a type of display format that enables users to choose commands, start programs, and view lists of files and other options by pointing to pictorial representations and lists of menu items on a display screen, such as display device 38. Choices can generally be activated with a keyboard, such as keyboard 26 or a mouse, such as mouse 34.

Any suitable machine-readable media may retain the GUI, such as RAM 16, ROM 14, a magnetic diskette, magnetic tape, or CD-ROM storage device (the last three being located in disk and tape drives 18). Any suitable operating system and associated graphical user interface may direct CPU 12. Other technologies can be utilized in association with CPU 12, such as touch-screen technology or human voice control. Data-processing system 10 may be implemented as a computer workstation, personal computer, "laptop" computer, and other similar devices.

Figure 2A:
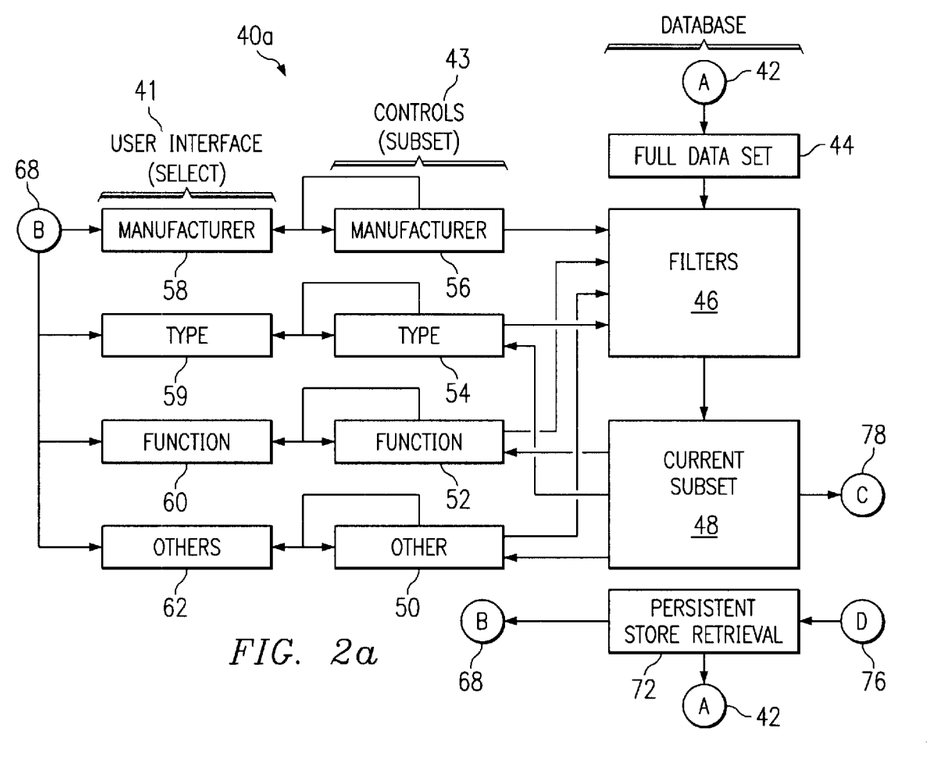
FIG. 2(a) depicts a system diagram illustrating operations for implementing the method and system of the present invention, in accordance with a preferred embodiment of the present invention.
Figure 2B:
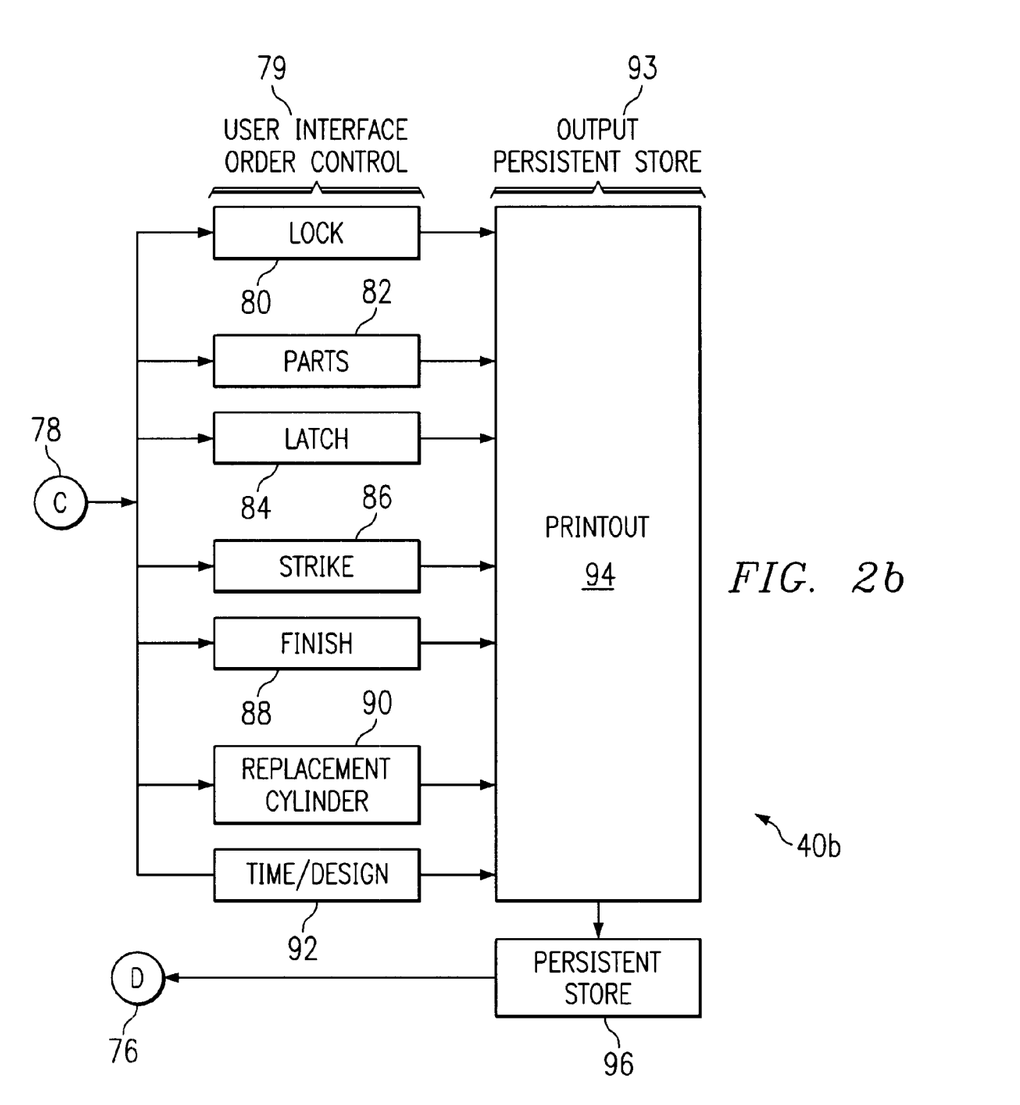
FIG. 2(b) illustrates additional operational steps associated with the system diagram of FIG. 2(a), in accordance with a preferred embodiment of the present invention.

Having described a sample data processing system 10 in which the invention can be practiced, reference is made to FIG. 2(a) which depicts a system diagram 40a illustrating operations for implementing the method and system of the present invention, in accordance with a preferred embodiment of the present invention. FIG. 2(b) illustrates additional operational steps associated with system diagram 40a of FIG. 2(a), in accordance with a preferred embodiment of the present invention. The additional operational steps depicted in FIG. 2(a) are illustrated in system diagram 40b. Those skilled in the art will appreciate that together system diagrams 40a and 40b compose a single system diagram. Also, similar parts are referenced by the same reference numerals in both FIGS. 2(a) and 2(b). FIGS. 2(a) and 2(b) should be interpreted as an integrated system diagram.

As indicated at block 42 of FIG. 2(a), information is provided via a database stored within a memory location of a computer, such as data-processing system 10 of FIG. 1. The database contains door hardware data, including graphical illustrations of door hardware assemblies, sub-assemblies, and components. The door hardware data also includes door hardware manufacturer data, door hardware specifications, and door hardware design information.

As depicted at block 42, a full data set can be retrieved from the database. However, given the fact that most users do not want access to the entire database, but prefer to retrieve specific information on a piecemeal basis, filters are provided, as indicated at block 46, which enables users to retrieve specific desired information relative to specific door hardware items. The filters function together with the other components of FIG. 2(a) and FIG. 2(b) as a search mechanism. The search mechanism is configured to retrieve specified door hardware items from the database based on a set of user entered search criteria. The filters illustrated at block 46 are features that utilize user entered search criteria and flag particular information within the database that corresponds to the search criteria.

As depicted at heading 41 labeled "User Interface (Select)," the user can manipulate the filters illustrated at block 46 utilizing user interface selection criteria. The selection criteria is organized according to manufacturer selection criteria, as indicated at block 58, type selection criteria, as illustrated at block 59, function selection criteria, as depicted at block 60 and "other" selection criteria, as described at block 62. The selection may take place within a user interface, such as a graphical user interface (GUI) environment.

Additional controls are provided, as indicated at heading 43 labeled "Controls (Subset)" which enable a user to dynamically manipulate the filters further to flag subset data. Manufacturer subset information, type subset information, function subset information, and "other" subset information are respectively illustrated at blocks 56, 54, 52, and 50. For example, a user may request specific manufacturer information via the user interface, as illustrated at block 58, and further refine this manufacturer information, as depicted at block 56, to obtain additional information about the manufacturer of a particular door hardware item. The selection criteria illustrated at blocks 58, 59, 60 and 62 may be manipulated in response to user input, as indicated at block 68.

When the filters have flagged the desired door hardware data contained within the full data set of the database, according to the user entered selection criteria, along with any additional subset manipulations, the desired data is stored as a current subset of the full data set, as illustrated at block 48. This current subset data may be narrowed even further utilizing the aforementioned subset controls and user selection criteria shown respectively below headings 43 and 41 in FIG. 2(*a*).

Turning now to FIG. 2(*b*), the current data subset, as indicated at block 78, can be analyzed further according to individual components described and maintained in the current data subset. Specified components for refining the current subset are illustrated below heading 79, labeled "User Interface Order Control." The controls are displayed for users as icons or objects within a graphical user interface that operates within a data-processing system such as data-processing system 10 of FIG. 1.

The icon itself is an image depicted on a display screen of a computer as a symbolic representation of objects or processes available within the computer. The controls are grouped according to "lock" data, as indicated at block 80, "parts" data, as illustrated at block 82, "latch data," as described at block 84, "strike" features, as indicated at block 86, "finish" features, as depicted at block 88, "replacement cylinder" data, as illustrated at block 90, and "time/design" features, as described at block 92.

If, for example, the current data set, as illustrated at block 78, contains door hardware manufacturer data about a particular type of door hardware device, the user interface controls illustrated below heading 79 can be utilized to view only "parts" and "lock" data related to door hardware items associated with that manufacturer only. The user interface controls depicted below heading 79 thus permit users to manipulate the current data set containing door hardware data to retrieve and display specific information about the current data set.

The controls include a "strike" feature, as depicted at block 86, which permits a user to select a certain strike style for a desired piece of door hardware from the current data set. The "finish" feature, illustrated at block 88, permits a user to select "finish" information associated with the current data set. For example "finish" information pertaining to a particular door hardware item that may be stored within the database include information such as an item finish name, finish identification number, U.S. finish code, and so forth. The "replacement cylinder" feature depicted at block 80 permits a user to replace a particular feature of the current data set (e.g., a selected cylinder component associated with door hardware data of the current data set) with another feature (i.e., a different cylinder component).

Those skilled in the art can thus appreciate that a user who takes advantage of these controls can customize the door hardware selection criteria contained in the current data set to his or her desired specifications to find desired door hardware items. This configuration offers numerous advantages in the form of saving time and energy in perusing through multiple door hardware printed catalogs and varying, often contradictory, presentation of door hardware specifications found in such catalogs.

Figure 9:
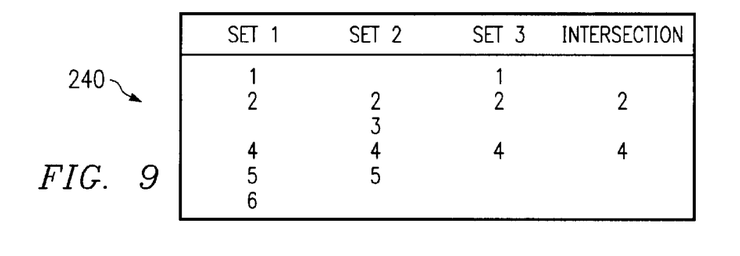
FIG. 9 illustrates a diagram illustrating the intersection of three data sets, in accordance with a preferred embodiment of the present invention.
Figure 10:
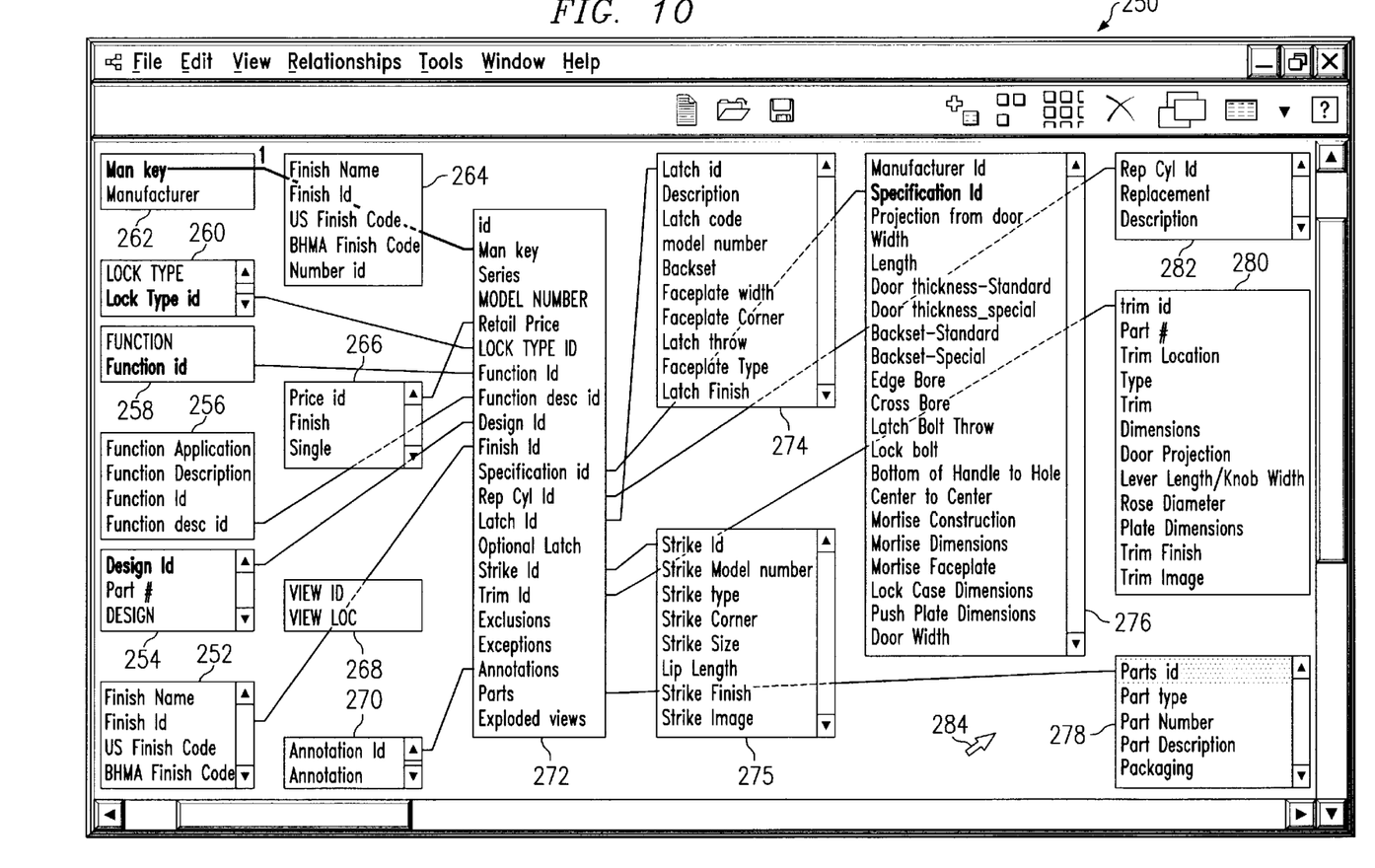
FIG. 10 illustrates a graphical user interface window in which four primary search fields are displayed, in accordance with a preferred embodiment of the present invention.

When the user has manipulated the current data set further, utilizing the user interface controls illustrated below heading 79, the final data set may be displayed visually within a graphic user interface and/or printed as a hard copy output, as illustrated at block 94 below heading 93 labeled "Output, Persistent Store." Visually, the manipulated current data set containing door hardware data, is displayed within a graphical presentation area of the graphic user interface. An example of a suitable graphical user interface is shown in FIGS. 9 and 10 as described below.

The manipulated door hardware data contained within the current data set is then stored, as illustrated at block 96, within a persistent storage area of the data-processing system in which the graphical user interface resides. Persistent storage is a memory feature of the data-processing system that remains intact, such as ROM 14 of FIG. 1. The data contained in persistent storage, as illustrated next at block 76, may then be retrieved via a persistent storage retrieval mechanism, as indicated at block 72 of FIG. 2(*a*). A user can request data retrieval from persistent storage, as indicated at block 68 of FIG. 2(*a*), thereby transferring the data from persistent storage into the original database as depicted at block 42.

Figure 3A:
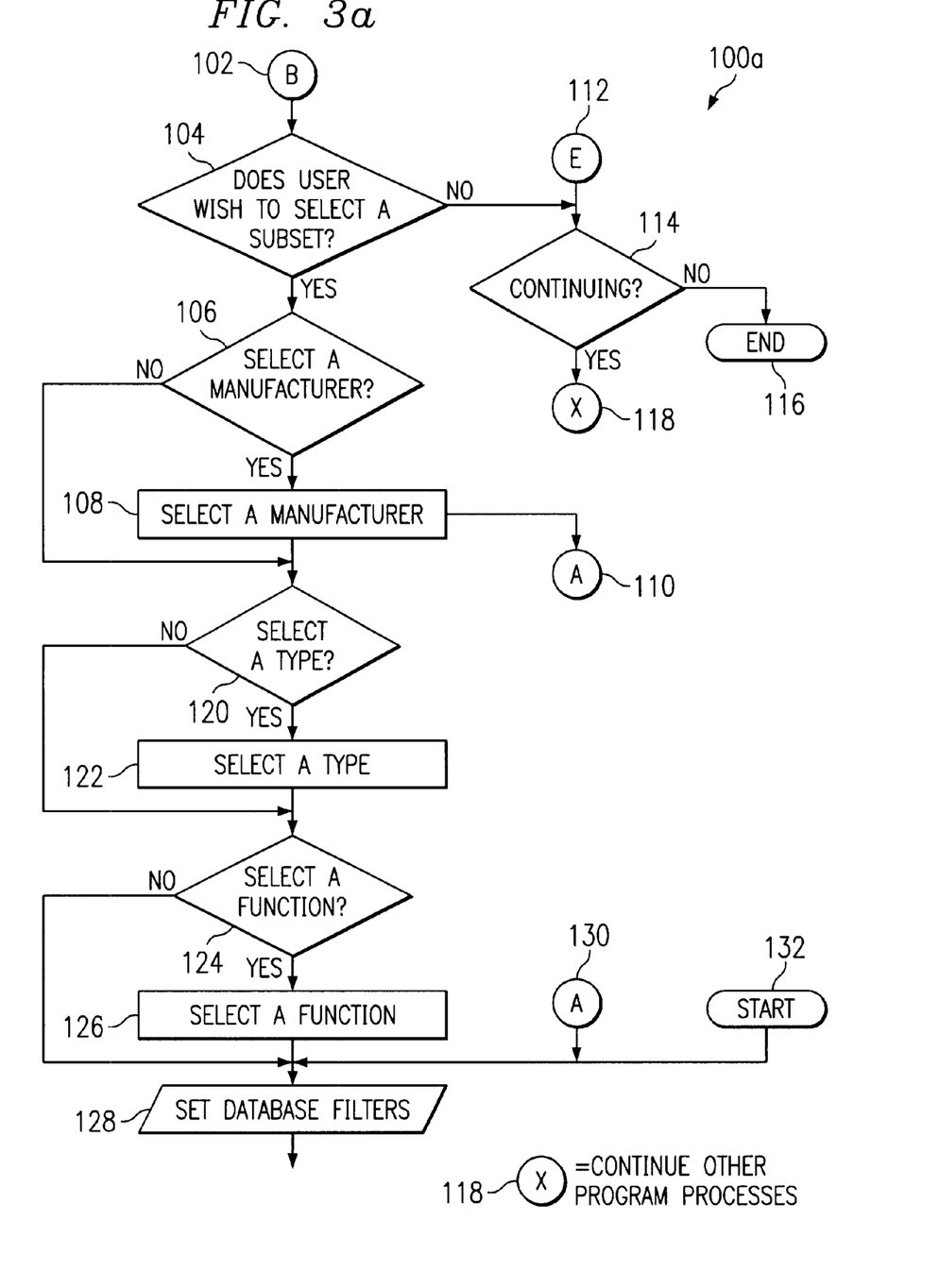
FIG. 3(a) depicts a high-level logic flow diagram of a selection algorithm, in accordance with a preferred embodiment of the present invention.
Figure 3B:
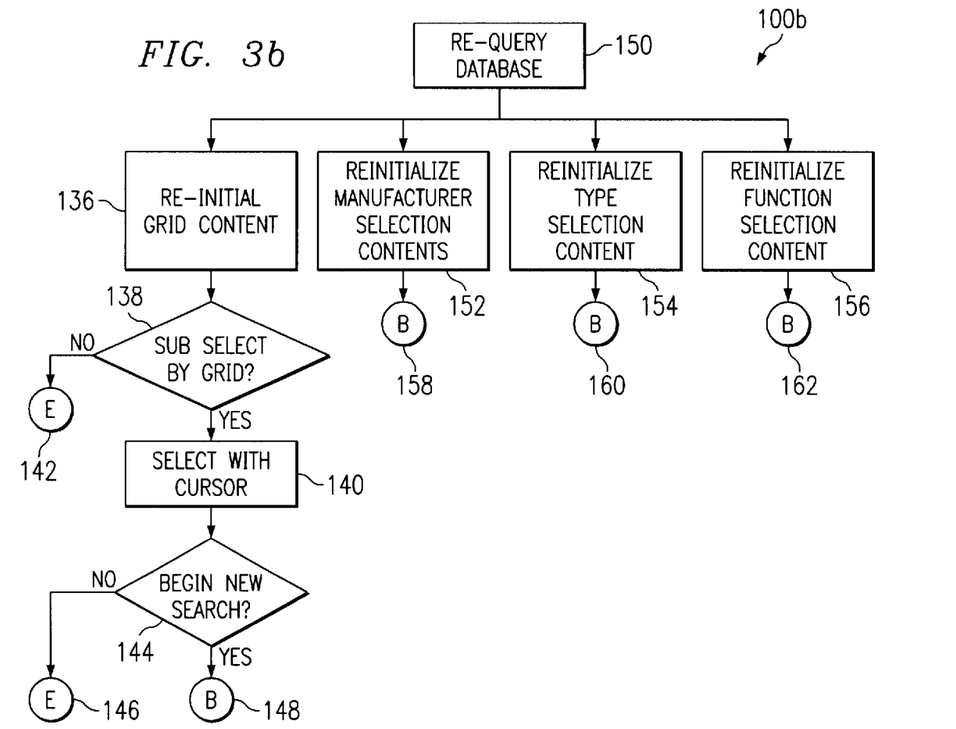
FIG. 3(b) illustrates additional operational steps of the high-level logic flow diagram of FIG. 3(a), in accordance with a preferred embodiment of the present invention.

FIGS. 3(*a*) and 3(*b*) illustrate high-level logic flow diagrams illustrating selection steps for implementing the method and system of the present invention, in accordance with a preferred embodiment of the present invention. It can be appreciated by those skilled in the art that FIGS. 3(*a*) and 3(*b*), as illustrated and described herein, present a self-consistent sequence of steps leading to a desired result. The steps are those requiring the physical manipulation of physical quantities. Usually, although not necessarily, these quantities take the form of electrical or magnetic signals capable of being stored, transferred, combined, compared, and otherwise manipulated.

It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as "configuring," "retrieving" or "displaying", which are commonly associated with mental operations performed by a human operator. No such capability of a human operator is necessary or desirable in most cases of the operations described herein, which form part of the present invention. As indicated herein, these operations are primarily machine operations. Useful machines for performing operations of a preferred embodiment of the present invention include data-processing systems, such as a general-purpose digital computer, desktop or notebook computer or other similar devices. In all cases the distinction between the method of operations in operating a computer and the method of computation itself should be borne in mind.

It can be appreciated by those skilled in the art that the method and system described herein can be implemented as a program product (e.g., a control program residing in a computer memory). The program product contains instructions that when executed on a CPU (e.g. CPU 12 of FIG. 1), carry out the operations depicted in the logic flow diagrams of FIGS. 3(*a*) and 3(*b*). While the present invention is described in the context of a fully functional data-processing system, those skilled in the art will further appreciate that the present invention is capable of being distributed as a program product in a variety of forms. The present invention applies equally, regardless of the particular type of signal-bearing media utilized to actually carry put the distribution. Examples of signal-bearing media include recordable-type media, such as floppy disks, hard-disk drives and CD ROM's, and transmission-type media, such as digital and analog communication links.

Preferred implementations of the invention can include implementations to execute the method or methods described herein as a program product residing in the memory of microcomputer. The program product thus includes sets of instructions for executing the method and system described herein. Until required by a microcomputer, the set of instructions may be stored as a computer-program product in another computer memory. For example, the set of instructions may be stored as a computer-program product in a disk drive attached to a microcomputer (which may include a removable memory such as an optical disk or floppy disk for eventual use in the disk drive).

The computer-program product can also be stored at another computer and transmitted, when desired, to a user's workstation by an internal or external network. Those skilled in the art will appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements.

FIG. 3(a) thus depicts a high-level logic flow diagram 100a of a selection algorithm, in accordance with a preferred embodiment of the present invention. FIG. 3(b) illustrates additional operational steps of logic flow diagram 100a of FIG. 3(a). These additional operational steps are depicted in logic flow diagram 100b of FIG. 3(b). Those skilled in the art will appreciate that FIGS. 3(a) and 3(b) should be interpreted as an integrated logic flow diagram.

As depicted at block 102 user input initiates processing of the subsequently illustrated process steps. The user is prompted, as indicated at block 104, to select a subset of door hardware data contained in the database. If the user does not desire to select a data subset, then as described at block 114, the user is presented with several options. The user can simply terminate the program, as indicated at block 116, or given user input, as indicated at block 112, the user may continue other program processes, as illustrated thereafter at block 118.

Assuming that the user does in fact desire to select a subset, then the user is prompted to select a door hardware manufacturer, as illustrated at block 106. The manufacturer is selected, as described at block 108, and the manufacturer information is furnished to the data subset, as indicated at block 110. If a manufacturer is not selected, the process simply continues, as indicated at block 120. Even if a manufacturer is selected, the operation described at block 120 is still processed.

The user is prompted to select a door hardware type, as depicted at block 120. If the user does not desire to select a door hardware type, then the process continues, as illustrated at block 124. If the user wishes to select a door hardware type, then the door hardware type is selected, as described at block 122, and the process continues, as illustrated at block 124. As described at block 124, the user is prompted to select a door hardware function. If the user selects a door hardware function, then as indicated at block 126, that function is selected. Whether or not the user actually selects a function, the database filters are then set, as illustrated at block 128.

The filters manipulate the database, as described at block 130. User input initiates setting of the database filters, as illustrated at block 132. The filtering operation illustrated at block 128, together with the selection operations described at blocks 106, 108, 120, 122, 124, and 126, work together as a search mechanism. The search mechanism is configured in a manner to retrieve specified door hardware items from the database based on a set of user entered search criteria. The database itself is a database of door hardware items operably coupled to the search mechanism within a data-processing system, such as data-processing system 10 of FIG. 1.

Portions of the database may be displayed within the graphical user interface as a grid. The user may select components contained within the grid utilizing a cursor. In order to manipulate the database, further using fields and sub-fields graphically displayed within the graphical user interface, the database is queried again following setting of the database filters, as illustrated at block 128.

Thus, following processing of the operation described at block 128, the database is re-queried, as depicted at block 150. At this point in the process, several operations are available. Manufacturer selection contents may be re-initialized, as illustrated at block 152, and the information returned to the user, as indicated at block 158. Type selection content information may be re-initialized, as depicted at block 154, and the information returned to the user, as indicated at block 160. Also, function selection content may be reinitialized, as illustrated at block 156, and the information returned to the user, as described at block 162.

Additionally, the grid content itself may also be reinitialized, as indicated at block 136. The user is then prompted, as described at block 138, to select a data subset from the database utilizing the displayed grid. If the user does not select a data subset from the grid, the process ends, as indicated at block 142. Note that the operation described at block 142 of FIG. 3(b) is analogous to the operation depicted at block 112 of FIG. 3(a). Selection of the desired data subset from the grid takes place via a user-manipulated cursor, as indicated at block 140.

As illustrated thereafter at block 144, the user is prompted to begin a new search grid. If the user desires to begin a new search of the grid, and hence the door hardware database, the selection and search process described herein is repeated, as indicated at block 148. However, if the user does not wish to begin a new search, then the process terminates, as indicated at block 146. Block 146 of FIG. 3(b) is analogous to block 112 of FIG. 3(a).

Figure 4:
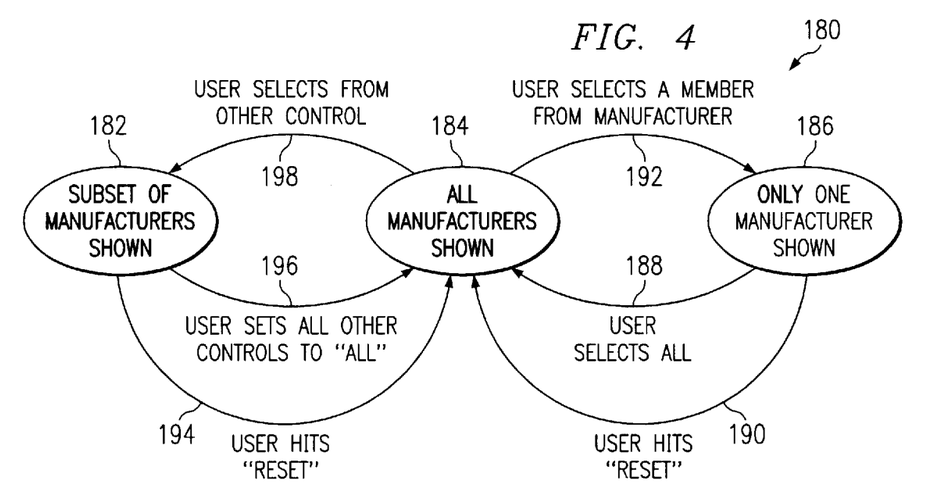
FIG. 4 depicts a selection control state diagram, in accordance with a preferred embodiment of the present invention.

FIG. 4 depicts a selection control state diagram 180, in accordance with a preferred embodiment of the present invention. State diagram 180 shows the interactions among manufacturer data maintained within the described door hardware database. As indicated at block 184, all manufacturers are displayed. When a user selects a particular member from the database (i.e., a particular manufacturer), as illustrated by arrow 192, only one manufacturer is displayed, as depicted at block 186.

If a user then selects "all" of the manufacturers, as indicated by arrow 188, all manufacturers are displayed again, as indicated at block 184. The user is typically prompted via an "all" icon displayed within the graphical user interface environment in which the present invention is implemented. If the user clicks a "reset" icon displayed within the graphical user interface, as described by arrow 190, a similar response results. All of the manufacturers are again shown, as illustrated at block 184.

If the user selects from "other" graphically displayed icon controls, as illustrated by arrow 198, a 'subset of manufacturers is then shown, as indicated at block 182. If the user then sets all other controls to "all" via an "all" icon displayed within the graphical user interface, as illustrated by arrow 196, again "all" manufacturers are displayed, as described at block 184. If, however, the user clicks a "reset" icon, as depicted by arrow 194, a similar result occurs. All manufacturers are thereafter shown as illustrated at block 198.

Those skilled in the art can appreciate that a variety of programming tools can be utilized to implement the method and system described herein. One example of a programming environment in which the method and system may be implemented is the "C++" development environment, well known in the programming arts. C++ is an object-oriented version of the C-programming language, also well known in the programming arts. Within this programming environment, programming tools are implemented as objects.

These objects can be developed as an object-oriented wrapper around a third-party Indexed Structured Access Method (ISAM) database tool by FairCom® known as C-Tree. Note that "FairCom" is a registered trademark of the FairCom Corporation, located in Columbia, Mo. C-Tree is based on ISAM routines available for file management and high speed random or sequential access. ISAM itself is a technique for decreasing the time necessary for locating data records within a large database, given a key value for identifying those records. A smaller index file is utilized to store the keys, along with pointers that locate corresponding records in a large central database file. Given a key, the index file is initially scanned for the key and an associated pointer is utilized to access remaining data of record in the central file.

C-Tree functions provide native access to a central database. However, in order to implement the method and system described herein utilizing C-Tree development tools, an extra layer is required to provide a more consistent interface to any unbound controls encountered during processing. Unbound controls are visual controls that are not "bound" to a database, file set or data set.

Figure 5:
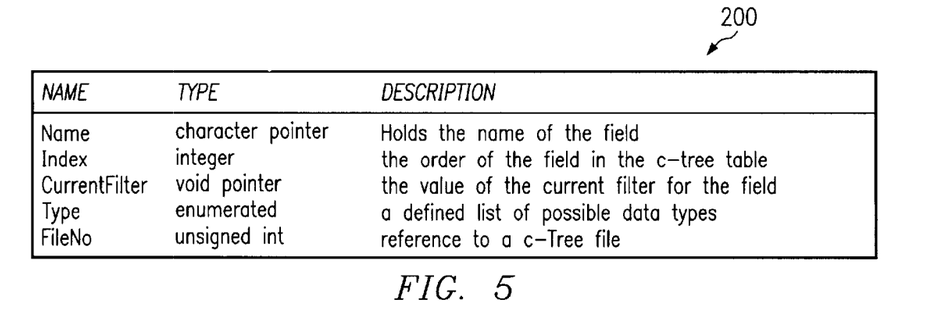
FIG. 5 illustrates a diagram listing public properties for the first of three primary programming objects utilized in accordance with a preferred embodiment of the present invention.

Those skilled in the art will appreciate that the description of programming objects presented herein does not discuss every method or property associated with potential programming objects. There are many unpublished, private properties, methods, and stand-alone functions that may be utilized "behind the scenes" to call C-Tree functions and provide ISAM database feedback. Such functions are not discussed here. Three major objects, however, are discussed FIG. 5 illustrates a diagram 200 listing public properties for the first of three primary programming objects utilized in accordance with a preferred embodiment of the present invention. The first of these three primary programming objects is referred to as "sdField". The sdField is an object that contains both the data (i.e., value) and characteristics of an individual field from a C-Tree record. The properties associated with sdField are utilized to identify the field and to internally translate and modify internal data formats. Programming methods associated with sdField are simply those methods that input and output data.

Input methods are overlooked to permit several object types to function as input parameters, while properties associated with sdField define internal activities that translate or modify, if necessary, the input form for storage in the sdField. Each sdField object can contain references to all rows in a table (to which it maintains a logical relationship) that satisfy the conditions of the current filter value. This is important when determining the subset of all sdField conditions. These internal sdField object properties acts as a buffer holding four-byte integers indicative of the offset of each C-Tree row. Note that C-Tree references all rows by their four-byte offset.

Figure 6:
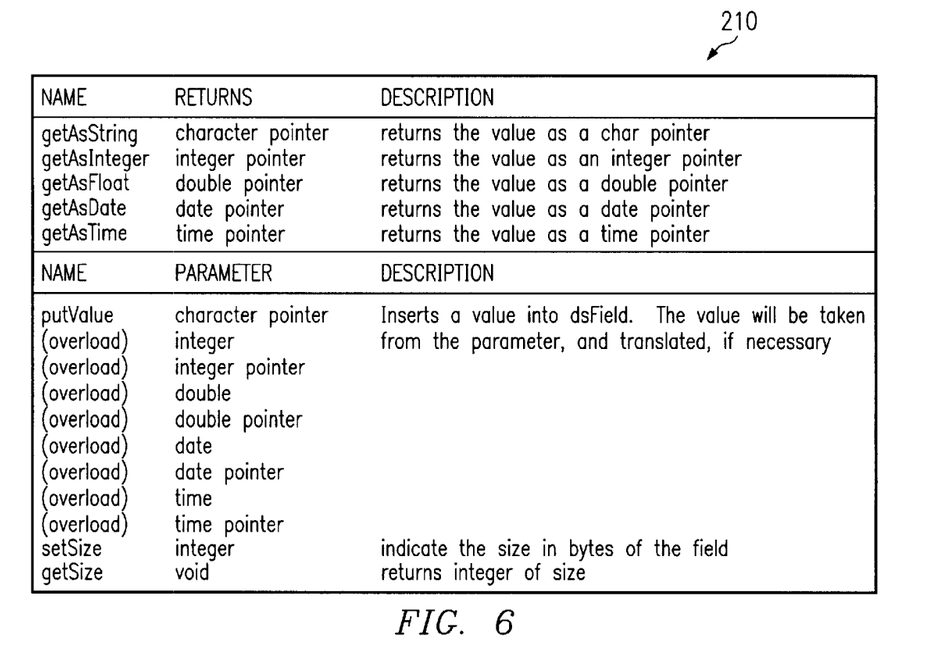
FIG. 6 depicts a diagram listing methods associated with the first of three primary programming objects utilized in accordance with a preferred embodiment of the present invention.

Diagram 200 of FIG. 5 thus depicts a listing of the public methods of sdField grouped according to Name, Type, and Description. FIG. 6, on the other hand, depicts a diagram 210 listing methods associated with the first of three primary programming objects utilized in accordance with a preferred embodiment of the present invention. The methods are grouped according to Name, Returns and Description, and Name, Parameter, and Description.

FIG. 7 illustrates a diagram 220 listing properties associated with the second of three primary programming objects utilized in accordance with a one embodiment of the present invention. This second object is referred to as "sdFieldList" and functions as a list container for the sdField object. The sdFieldList object contains one or more sdField objects in a double-linked list. The sdFieldList does not have any public properties. However, all information about the sdFieldList object is obtained through public methods. SdFieldList is grouped according to Name, Parameter, and Description, as depicted in diagram 220 of FIG. 7.

FIG. 8 depicts a diagram 230 listing methods and properties associated with the third of three primary programming objects utilized in accordance with a preferred embodiment of the present invention. This third object is referred to as "sdRow" and is derived from the sdFieldList object. The sdRow object inherits all properties and methods of the sdFieldList object. However, sdRow extends the interactions via an individual C-Tree file. Among the interactions available is the ability to filter and divide the current contents of a table or grid into subsets.

The sdRow object contains a private property that holds references to all c-Tree file records that satisfy all of the filter requirements of all of the individual filters present in each of the sdField objects of the sdFieldList. In essence, sdRow object holds individual subsets of record references in each sdField object and quickly determines the intersection of all of those sdField subsets. Working from the file offset record references, sdRow can quickly retrieve records from the c-Tree file, making the data from those records available. As indicated, in FIG. 8, various methods and properties add to the sdRow functionality, which is grouped according to Property, Type and Description, and Method, Parameters, and Description.

These objects can be utilized to provide a visual component for the present invention. The visual components provide choices to a user concerning, for example, particular locks or other door hardware of interest. Although the selection components described herein have been discussed in the context of Manufacturer, Type, and Function, those skilled in the art will appreciate that any number of other selection components may be utilized in accordance with a preferred embodiment of the present invention. By selecting one of the choices provided by these components, an appropriate filter value is set in the companion sdField.

By setting the value, the file/record subset is recalculated for the sdField. After each sdField filter is set, the sdRow buffer is recalculated. The sdRow buffer contains references to the intersection of all sdField subsets. Many subsets are consequently maintained within each sdRow object. For example, from a list of locks, the sdRow object can maintain an sdField for the Manufacturer identification, an sdField for the Type identification, and an sdField for the Function identification. Within each sdField, a buffer is maintained that holds the subset of a master table satisfying individual filters. Within the sdRow object, a similar buffer exists for holding the intersection of all subsets within the sdRow. An example of such intersections of subsets is indicated in FIG. 9, which illustrates a diagram 240 of the intersection of three data sets, in accordance with a preferred embodiment of the present invention. Based on the foregoing, those skilled in the art can thus appreciate that such techniques can be utilized, according to the present invention, for each table, either a master table or "look up" table, to determine the contents of the visual tools.

FIG. 10 illustrates the relationship between primary search fields of a door hardware database, denoted generally as 250, in accordance with one embodiment of the present invention. The method and system described herein can be implemented within the context of an electronic database containing a plurality of door hardware items which are categorized and organized using well known means in the data-processing arts. Four primary search fields are provided in database 250 from which a user can initiate the search, retrieval and browsing of door hardware items. The four primary search fields include a manufacturer field 262, a lock field 260, a function field 256, and a design field 254.

A primary advantage of the present invention as can be appreciated by reference to the database 250 and the relationships of the fields therein including primary search fields 262, a lock field 260, a function field 256, and a design field 254 is the organization of previously unrelated door catalog specification data into a single integrated electronic system. These relationships are indicated by the arrows or lines between the fields of the database 250 as illustrated in FIG. 10. As shown, the primary fields, 262, 264, 256 and 254 are related to a plurality of subfields which are used to classify and store the door hardware items regardless of the manufacturer, finish type, and part numbering system, among other qualifiers.

For example, the subfield 266 of the primary search field 256 permits a user to further refine the database search according to Price id, finish and single or double locking configuration among other variables. Other subfields of interest include a design field 254, which provides a user with information pertaining to door hardware designs and a "finish" field 252 which provides finish information about door hardware items maintained within the door hardware database 250. Thus, the structure of the database 250 permits the user to sort, retrieve and browse all items according to the available subfields.

Likewise, if a user desires annotation details pertaining to the items listed in "finish" field 252, the user can view and retrieve data maintained within annotation field 270. These annotation data can be further refined via field 272 and either field 274 or 275. Those skilled in the art can thus appreciate that increased searching granularity is achieved each time a subfield is accessed by a user.

The user interface to the system of the present invention according to one embodiment can be devised and used to access the content of the database 250. In this regard, a particular door hardware part can be illustrated and maintained in the form of graphical files (e.g., tif, .jpg, etc.). Users can thus activate search features within database 250 that permit them to view graphical representations of desired door hardware parts, such as graphic representations of locks, door knobs, strike plates, and so forth. Example graphical user interfaces illustrating such graphical representations are shown in more detail in FIG. 11 and FIG. 12.

Figure 11:
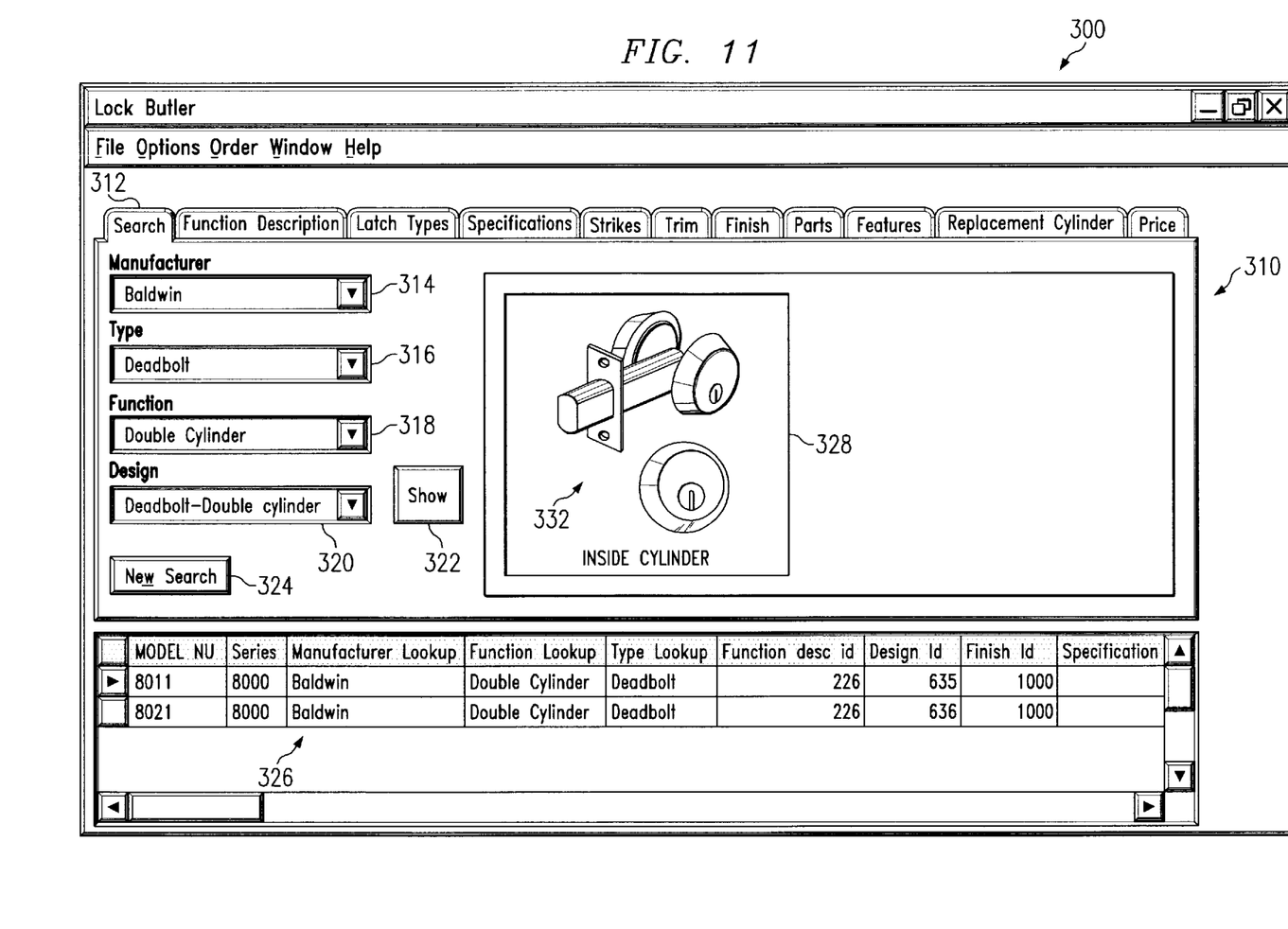
FIG. 11 depicts a graphical user interface window in which graphical representations of door hardware items as selected by the user are displayed, in accordance with a preferred embodiment of the present invention.
Figure 12:
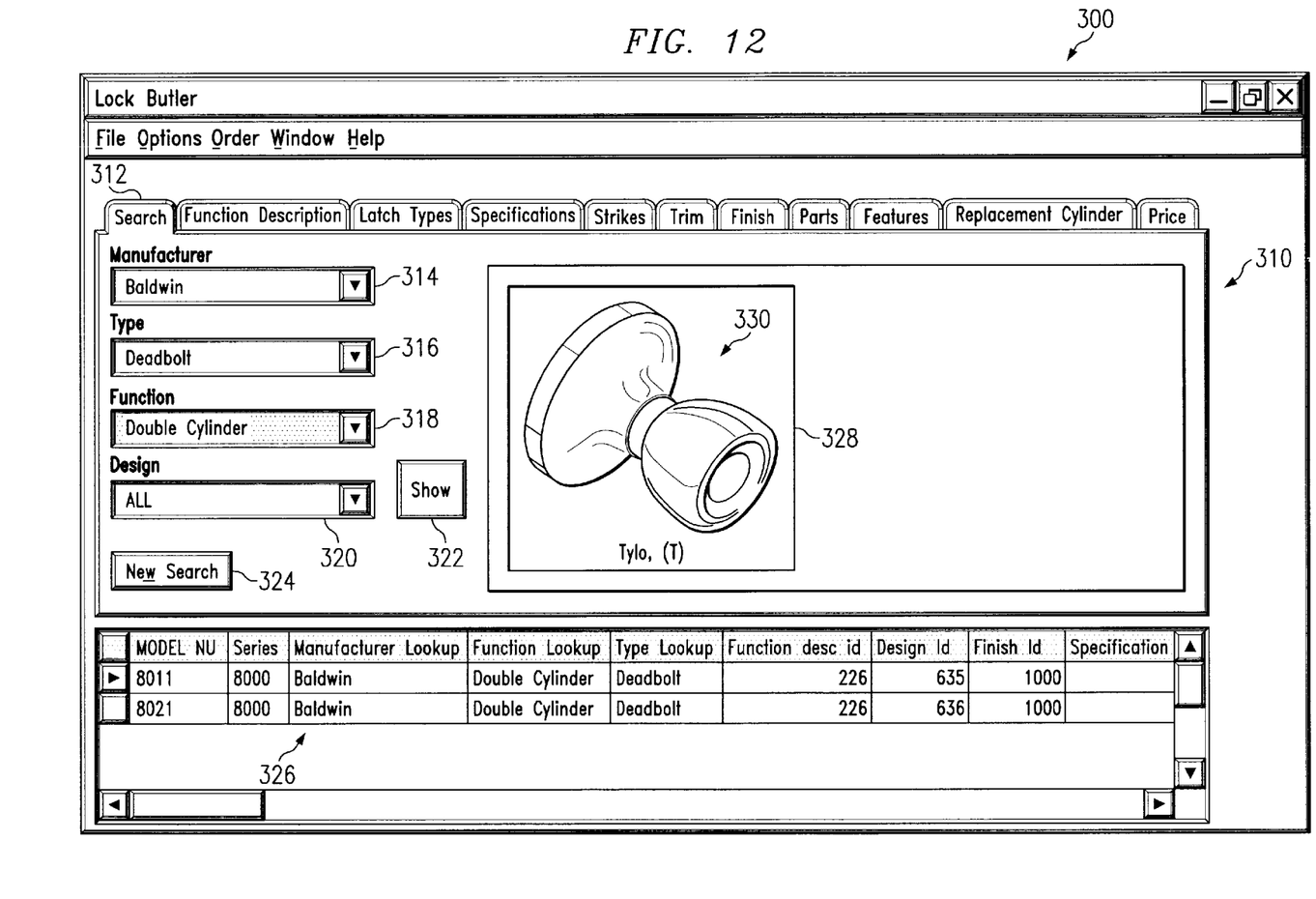
FIG. 12 illustrates a graphical user interface window in which an alternative graphical representation of a door hardware item as selected by the user are displayed, in accordance with a preferred embodiment of the present invention.

FIG. 11 depicts a graphical user interface window 300 in which graphical representations 332 of door hardware items are displayed, in accordance with one embodiment of the present invention. FIG. 12 also illustrates window 300 and an alternative graphical representation 328 of a door hardware item, in accordance with a second embodiment of the present invention. Note that in FIG. 11 and FIG. 12, like parts are indicated by like reference numerals.

Window 300 includes a series of tabs 310, which permit a user to access the same information that is provided in the primary fields and subfields indicated in the database 250 of FIG. 10. Tabs 310 provide selection means, which when activated by a cursor or other user controlled interface, permit a user to search the database 250 for specific door hardware information, such as "function description," "latch types," "specifications," "strikes," "trim," "finish," "parts," "features," "replacement cylinder," and "price." In the example depicted in FIG. 11, four primary fields are again displayed. These primary fields include a manufacturer field 314, a type field 316, a function field 318, and a design field 320. These particular fields are displayed beneath search tab 312.

In the example of FIG. 11, a user is presented with a search tab 312. The user has chosen a manufacturer (i.e., Baldwin), a specific type of door hardware item (i.e., deadbolt), a particular function (i.e., double cylinder), and a design (i.e., deadbolt-double cylinder). The database is scanned via the search mechanism described herein for those door hardware items that correspond to the user entered search items described above (i.e., Baldwin, deadbolt, etc.). The result of this search is displayed within a database display area 326.

Only those items chosen, based on the user entered search criteria, are displayed within the database display area 326. In the example depicted in FIG. 11, two model numbers, (8011 and 8021) are displayed within the database display area, along with specific related information (e.g., series, manufacturer, function, type, function, design I.D., finish I.D., and so forth). The user can view a graphical representation of the retrieved database items by "clicking" the "show" icon 322 with a user interface, such as a cursor or mouse pointer, for example. The desired graphical representations 332 of the door hardware items are then displayed within graphical display area 328. In the example depicted in FIG. 11, graphical representations 332 of a deadbolt double cylinder are depicted. In the example depicted in FIG. 12, a graphical representation of a doorknob having a deadbolt type and double cylinder function is depicted with graphical display area 330.

Although the present invention is described herein in the context of a "windows" type graphical user interface environment, the present invention is not limited to a windows environment. The present invention can be practiced in any defined region of an interface having defined borders. The embodiments and examples set forth herein are presented in order to best explain the present invention and its practical application and to thereby enable those skilled in the art to make and utilize the invention.

However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A system adapted for electronically storing, searching and retrieving door hardware item data, said system comprising:
   a database configured for storing a plurality of door hardware data including door hardware manufacturer data from multiple manufacturers;
   a search mechanism configured to electronically retrieve specified door hardware data from said database based on a set of user entered search criteria that allows the identification door items based on the user entered search criteria such as function description, latch types, specifications, strikes, trim, finish, parts, features, replacement cylinder, and price; and a display mechanism for displaying said door hardware data to a user, said display presenting a user interface configured to permit a user to enter search criteria for specific door hardware items and to view data corresponding to said specific door hardware.

2. The system of claim 1 further comprising retrieval mechanism for electronically retrieving specified door hardware items from said database via said search mechanism, in response to user entered search criteria.

3. The system of claim 1 wherein said display mechanism further comprises a graphical user interface adapted to display door hardware items in graphical representations in connection with electronically retrieving said specific door hardware items from said database.

4. The system of claim 3 further wherein said database is organized according to a plurality of object fields configured for storing door hardware data.

5. The system of claim 4 further comprising a prompting mechanism for prompting a user to select a particular subset of said database by selecting an object field from among said plurality of object fields.

6. The system of claim 5 wherein said search mechanism is configured to automatically search for said particular subset of said database, in response to a user selection of said object field, such that said particular subset of said database comprises specified door hardware items.

7. The system of claim 6 wherein said graphical user interface further comprises a display area for automatically displaying specific door hardware data associated with said door hardware items.

8. The system of claim 1 wherein a subset of said database is configured to store door hardware type data.

9. The system of claim 1 wherein a subset of said database is configured to store door hardware function data.

10. The system of claim 9 wherein said search mechanism is configured to search said database and retrieve specific door hardware data according to manufacturer, type and function.

11. A method in a data-processing system for electronically retrieving door hardware items from a database including manufacturer data from multiple manufacturers, said method comprising the steps of:

operably coupling a search mechanism to said database;

configuring said search mechanism to electronically retrieve specified door hardware items from said database based on a set of user entered search criteria that allows the identification door items based on the user entered search criteria such as function description, latch types, specifications, strikes, trim, finish, parts, features, replacement cylinder, and price; and automatically displaying said, door hardware items in a user interface within said data-processing system, in response to electronically retrieving said specified door hardware items from said database.

12. The method of claim 11 further comprising the step of:
electronically retrieving specified door hardware items from said database via said search mechanism, in response to user input.

13. The method of claim 12 wherein the step of automatically displaying said door hardware items in a user interface within said data-processing system, in response to electronically retrieving said specified door hardware items from said database, further comprises the step of:

automatically displaying said door hardware items as graphical door hardware representations in a graphical user interface within said data-processing system, in response to electronically retrieving said specified door hardware items from said database.

14. The method of claim 13 further comprising the step of:
graphically displaying a plurality of object fields within said graphical user interface, wherein each of said object fields is associated with a particular subset of said database.

15. The method of claim 14 further comprising the step of:
prompting a user to select a particular subset of said database by selecting an object field from among said plurality of object fields.

16. The method of claim 15 further comprising the step of:
automatically searching for said particular subset of said database, in response to a user selection of said object field, such that said particular subset of said database comprises specified door hardware items.

17. The method of claim 16 wherein the step of automatically displaying said door hardware items as graphical door hardware representations in a graphical user interface within said data-processing system, in response to electronically retrieving said specified door hardware items from said database, further comprises the step of:

automatically displaying specific door hardware data associated with said door hardware items in a database view area of said graphical user interface.

18. The method of claim 17 wherein the step of graphically displaying a plurality of object fields within said graphical user interface, wherein each of said object fields is associated with a particular subset of said database, further comprises the step of:

graphically displaying a plurality of object fields within said graphical user interface, wherein each of said object fields is associated with a particular subset of said database, said particular subset comprising door hardware manufacturer data.

19. The method of claim 18 wherein the step of graphically displaying a plurality of object fields within said graphical user interface, wherein each of said object fields is associated with a particular subset of said database, further comprises the step of:

graphically displaying a plurality of object fields within said graphical user interface, wherein each of said object fields is associated with a particular subset of said database, said particular subset comprising door hardware assembly data.

20. The method of claim 19 wherein the step of graphically displaying a plurality of object fields within said graphical user interface, wherein each of said object fields is associated with a particular subset of said database, further comprises the step of:

graphically displaying a plurality of object fields within said graphical user interface, wherein each of said object fields is associated with a particular subset of said database, said particular subset comprising door hardware sub-assembly data.

21. The method of claim 20 wherein the step of configuring said search mechanism to electronically retrieve specified door hardware items from said database based on a set of user entered search criteria, further comprises the step of:

configuring said search mechanism to electronically retrieve specified door hardware items from said database based on a set of user entered search criteria, wherein said search criteria comprises search criteria for selecting door hardware manufacturer data, door hardware assembly data, and door hardware sub-assembly data.

22. A program product residing in a computer for electronically retrieving door hardware items from a database including door hardware manufacturer data from multiple manufacturers, said program product comprising:

instruction mechanism residing in a computer for configuring a search mechanism to electronically retrieve specified door hardware items from said database based on a set of user entered search criteria that allows the identification door items based on the user entered search criteria such as function description, latch types, specifications, strikes, trim, finish, parts, features, replacement cylinder, and price;

instruction mechanism residing in a computer for operably coupling said search mechanism to said database; and instruction mechanism residing in a computer for automatically displaying said door hardware items in a user interface, in response to electronically retrieving said specified door hardware items from said database.

23. The program product of claim 22 further comprising:

instruction mechanism residing in a computer for electronically retrieving specified door hardware items from said database via said search mechanism, in response to user input.

24. The program product of claim 23 wherein said instruction mechanism residing in a computer for automatically displaying said door hardware items in a user interface, in response to electronically retrieving said specified door hardware items from said database, further comprises:

instruction mechanism residing in a computer for automatically displaying said door hardware items as graphical door hardware representations in a graphical user interface, in response to electronically retrieving said specified door hardware items from said database.

25. The program product of claim 24 further comprising:

instruction mechanism residing in a computer for graphically displaying a plurality of object fields within said graphical user interface, wherein each of said object fields is associated with a particular subset of said database.

26. The program product of claim 25 further comprising:

instruction mechanism residing in a computer for prompting a user to select a particular subset of said database by selecting an object field from among said plurality of object fields.

27. The program product of claim 26 further comprising:

instruction mechanism residing in a computer for automatically searching for said particular subset of said database, in response to a user selection of said object field, such that said particular subset of said database comprises specified door hardware items.

28. The program product of claim 27 wherein said instruction mechanism residing in a computer for automatically displaying said door hardware items as graphical door hardware representations in a graphical user interface, in response to electronically retrieving said specified door hardware items from said database, further comprises:

automatically displaying specific door hardware data associated with said door hardware items in a database view area of said graphical user interface.

29. The program product of claim 28 wherein a subset of said database comprises door hardware assembly data.

30. The program product of claim 28 wherein a subset of said database comprises door hardware sub-assembly data.

31. The program product of claim 30 wherein said search criteria comprises search criteria for selecting door hardware manufacturer data, door hardware assembly data, and door hardware sub-assembly data.

* * * * *